US010911464B2

(12) United States Patent
Pattar et al.

(10) Patent No.: US 10,911,464 B2
(45) Date of Patent: Feb. 2, 2021

(54) FRAMEWORK FOR MULTI-LEVEL AND MULTI-FACTOR INLINE ENROLLMENT

(71) Applicant: Oracle International Corporation, Redwood Shores, CA (US)

(72) Inventors: Nagaraj Pattar, Gulbarga (IN); Pruthvithej Ramesh Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 16/123,338

(22) Filed: Sep. 6, 2018

(65) Prior Publication Data

US 2019/0334921 A1     Oct. 31, 2019

(30) Foreign Application Priority Data

Apr. 27, 2018   (IN) .............................. 201841015992

(51) Int. Cl.
*H04L 29/06*    (2006.01)
*H04L 29/08*    (2006.01)
*H04L 9/32*     (2006.01)

(52) U.S. Cl.
CPC .......... *H04L 63/105* (2013.01); *H04L 9/3271* (2013.01); *H04L 63/0815* (2013.01); *H04L 63/0846* (2013.01); *H04L 63/0861* (2013.01); *H04L 63/102* (2013.01); *H04L 63/20* (2013.01); *H04L 67/327* (2013.01); *H04L 2463/082* (2013.01)

(58) Field of Classification Search
CPC . H04L 63/105; H04L 63/0846; H04L 9/3271; H04L 67/327; H04L 63/20; H04L 63/0861; H04L 63/0815; H04L 63/102; H04L 2463/082; H04L 63/083
See application file for complete search history.

(56) References Cited

U.S. PATENT DOCUMENTS

| | | |
|---|---|---|
| 2005/0235148 A1 | 10/2005 | Scheidt et al. |
| 2005/0268107 A1 | 12/2005 | Harris et al. |
| 2007/0136573 A1 | 6/2007 | Steinberg |
| 2008/0120711 A1 | 5/2008 | Dispensa |
| 2017/0064549 A1* | 3/2017 | Rykowski ............... H04W 4/14 |
| 2017/0094510 A1* | 3/2017 | Khosravi ............... G06F 21/32 |
| 2018/0054434 A1* | 2/2018 | Lingamallu ........... H04L 63/083 |
| 2018/0097787 A1* | 4/2018 | Murthy ................ H04L 63/102 |
| 2019/0334921 A1* | 10/2019 | Pattar .................... H04L 63/083 |

* cited by examiner

*Primary Examiner* — Michael R Vaughan
(74) *Attorney, Agent, or Firm* — Kilpatrick Townsend & Stockton LLP

(57) ABSTRACT

The present disclosure relates generally to access control, and more particularly, to techniques (e.g., systems, methods, computer program products storing code or instructions executable by one or more processors) for providing for inline enrollment in multi-level and multi-factor authentication of a user allowing login on a restricted website, or on an enterprise network with single sign-on, or on various other service systems with security restrictions.

20 Claims, 6 Drawing Sheets

FRAMEWORK FOR MULTI-LEVEL AND MULTI-FACTOR INLINE ENROLLMENT

CROSS-REFERENCE TO RELATED APPLICATION

The present application claims the benefit and priority of India Provisional Application No. 201841015992, filed Apr. 27, 2018 entitled "FRAMEWORK FOR MULTI-LEVEL AND MULTI-FACTOR AUTHENTICATION INLINE ENROLLMENT," the entire contents of which are incorporated herein by reference for all purposes.

FIELD OF THE INVENTION

The present disclosure relates generally to access control, and more particularly, to techniques for inline enrollment of multi-level and multi-factor authentication of a user on a restricted website, or on an enterprise network with single sign-on, or on various other service systems with security restrictions.

BACKGROUND

Many systems rely on a single and unique security level to access resources protected by the systems. Once a user authenticates, the user can access any resource they are authorized to access regardless of whether that resource provides any private or sensitive data that needs stronger identity verification of the user. This is usually performed by applying role-based access control or any other type of authorization policy. However, a single security level is not enough if a more fine-grained access control is required for access to resources, in particular for those that maintain private and sensitive data such as transaction confirmation, purchases, change password or edit profile information, administrative operations and so forth. In these cases, it may be desirable to confirm the identity of an authenticated user by asking a different and stronger credential (e.g., TOTP tokens, pseudo-random numbers sent to a smartphone, etc.) before moving forward with authentication of the user and providing access to the resources.

In order to overcome the limitations of single level authentication, multi-level authentication was developed as a technique that authenticates data at multiple levels. Many systems allow for different authentication levels to be assigned to the resources protected by the systems. The authentication levels are parameters that enable the systems to specify (e.g., using authentication policies) a particular authentication behavior for a resource. The authentication levels may be mapped to specific authentication plugins. An authentication plugin is an implementation of a specific authentication method (e.g., a password authentication or a digital certificate authentication). This method collects credentials from users and authenticates them. For example, a low sensitive application (A) may require a user name and password, whereas a higher sensitive application (B) may require a certificate. When a user tries to access application (A) on an HTTP server, the user is redirected to a single sign-on (SSO) server and forced to authenticate using a user name and password. If the user tries to move from application (A) to access application (B) on a different HTTP server, the user is again redirected to a single sign-on (SSO) server and forced to authenticate again using the higher credential, certificate.

A use of a single specific authentication method such as a password authentication or the digital certificate authentication at a level of authentication is known as single-factor authentication that identifies the user requesting access through only one category of credentials. Single-factor authentication for a system typically only requires a user to create an account by providing a username and associated password (e.g., a knowledge factor only authentication). Since passwords can easily end up in the wrong hands, this approach is not very secure. Therefore, enterprises and high-value web service providers such as banks often require multi-factor authentication, e.g., at least a second factor, specifically for higher sensitive resources (e.g., higher level authentication applications). The multi-factor approach requires a user to present at least two factors of identification from a set of factors potentially including: (1) a knowledge factor; (2) a possession factor; and (3) an inherence factor. The knowledge factor refers to something the user knows, for instance a password, pin code or passphrase; the possession factor refers to something the user owns, for instance a security fob, a magnetic card, a cell phone, or a tablet computer; and the inherence factor refers to something the user is. The inherence factor could be determined using biometrics such as fingerprint, iris or voice analysis.

Conventionally, additional security enrollment processes (e.g., beyond simply setting up an account with a password and username) are implemented on systems that utilizing multi-level and/or multifactor authentication processes. If the system has configured the user's account to require multi-level and/multi-factor authentication, the user will be unable to access a resource on the system until they complete the additional security enrollment processes. In the additional security enrollment process, the user may be able to specify their preferred method for multi-factor authentication, for example, possession factor using a mobile phone or office phone, and the user may register their mobile phone or office phone for the multi-factor authentication as a part of the enrollment process. Alternatively, the system may utilize policies that define rules for multi-factor authentication for users, groups of user, resources, services, etc., and the user may register their mobile phone or office phone for the multi-factor authentication as a part of the enrollment process. In systems using multi-level and/or multi-factor authentication it may be challenging but necessary to have the user enroll/register for the various levels or factors any number of times depending on the resources the user is trying to access. For example, the user wants to access the resources as soon as possible, and keeping the user blocked to enroll/register for all the levels and factors required to access the resource is irritating for the user. In contrast, simply providing access to the user without proper authentication can be a security vulnerability. Accordingly, new techniques are desired for enrolling users in multi-level and/or multi-factor authentication.

BRIEF SUMMARY

Systems, methods and computer-readable memory for controlling access to resources accessible in a distributed environment are described. Certain techniques are described for inline enrollment of multi-level and multi-factor authentication of a user on a restricted website, or on an enterprise network with single sign-on, or on various other service systems with security restrictions.

In various embodiments, a method is provided that includes receiving, at a computer system, a request for access to a resource; identifying, by the computer system, an authentication policy associated with the resource, where the authentication policy includes a multi-level and multi-factor challenge method to be used to authenticate a user for access to the resource; determining, by the computer system, a first level of the multi-level and multi-factor challenge method for authentication is completed, which generated an access session for the user; selecting, by the computer system, a second level of the multi-level and multi-factor challenge method that has not been completed for the authentication; identifying, by the computer system, a factor associated with completing the authentication of the second level based on the multi-level and multi-factor challenge method; determining, by the computer system, that the user is not enrolled for the factor; providing, by the computer system, a user interface understandable code as an enrollment form to the user via a user interface for inline enrollment of the user for the factor, where the user interface understandable code is provided while maintaining validity of the access session; once the inline enrollment of the user for the factor is completed, collecting, by the computer system, a credential for the factor from the user; determining, by the computer system, the credential collected for the factor is valid; and authenticating, by the computer system, the user for the second level based at least on the credential collected for the factor being valid.

In some embodiments, the method further includes creating, by the computer system, a context and request object for the request, wherein the context and request object includes; performing, by the computer system, an operation on the context and request object, wherein the operation includes calling a handler of the computer system based on the factor; and determining, by the handler of the computer system, whether the credential collected for the factor is valid.

In some embodiments, the method further includes intercepting, by an enrollment decorator of the computer system, the call to the handler prior to the call reaching the handler; and determining, by the enrollment decorator of the computer system, whether the user is enrolled for the factor.

In some embodiments, the method further includes once the user is determined not to be enrolled for the factor, invoking, by the computer system, a user interface mapper that maps the factor to the user interface understandable code; and updating, by the computer system, the context and request object to include information pertaining to the enrollment in the factor and the collection of the credential for the factor.

Optionally, the determining, by the handler of the computer system, whether the credential collected for the factor is valid includes evaluating the context and request object for the information pertaining to the collection of the credential for the factor. Further optionally, the determining, by the enrollment decorator of the computer system, whether the user is enrolled for the factor includes evaluating the context and request object for the information pertaining to the enrollment in the factor.

In some embodiments, the method further includes sending, by the computer system, a response message to the user that indicates the authentication was successful based at least on authenticating the user for the first level and the second level, wherein the response message includes a success URL to redirect the user to access the resource.

In various embodiments, a system is provided that includes an access management system that includes one or more processors and non-transitory machine readable storage medium having instructions stored thereon that when executed by the one or more processors cause the one or more processors to perform a process comprising: receiving, at the access management system, a request for access to a resource; identifying, by the access management system, an authentication policy associated with the resource, where the authentication policy includes a multi-level and multi-factor challenge method to be used to authenticate a user for access to the resource; determining, by the access management system, a first level of the multi-level and multi-factor challenge method for authentication is completed, which generated an access session for the user; selecting, by the access management system, a second level of the multi-level and multi-factor challenge method that has not been completed for the authentication; identifying, by the access management system, a factor associated with completing the authentication of the second level based on the multi-level and multi-factor challenge method; determining, by the access management system, that the user is not enrolled for the factor; providing, by the access management system, a user interface understandable code as an enrollment form to the user via a user interface for inline enrollment of the user for the factor, wherein the user interface understandable code is provided while maintaining validity of the access session; once the inline enrollment of the user for the factor is completed, collecting, by the access management system, a credential for the factor from the user; determining, by the access management system, the credential collected for the factor is valid; and authenticating, by the access management system, the user for the second level based at least on the credential collected for the factor being valid.

In some embodiments, the process further includes creating, by the access management system, a context and request object for the request, wherein the context and request object includes; performing, by the access management system, an operation on the context and request object, wherein the operation includes calling a handler of the access management system based on the factor; and determining, by the handler of the access management system, whether the credential collected for the factor is valid.

In some embodiments, the process further includes intercepting, by an enrollment decorator of the access management system, the call to the handler prior to the call reaching the handler; and determining, by the enrollment decorator of the access management system, whether the user is enrolled for the factor.

In some embodiments, the process further includes once the user is determined not to be enrolled for the factor, invoking, by the access management system, a user interface mapper that maps the factor to the user interface understandable code; and updating, by the access management system, the context and request object to include information pertaining to the enrollment in the factor and the collection of the credential for the factor.

Optionally, the determining, by the handler of the access management system, whether the credential collected for the factor is valid includes evaluating the context and request object for the information pertaining to the collection of the credential for the factor. Further optionally, the determining, by the enrollment decorator of the access management system, whether the user is enrolled for the factor includes evaluating the context and request object for the information pertaining to the enrollment in the factor.

In some embodiments, the process further comprises sending, by the access management system, a response message to the user that indicates the authentication was successful based at least on authenticating the user for the first level and the second level, wherein the response message includes a success URL to redirect the user to access the resource.

In various embodiments, a non-transitory machine readable storage medium is provided having instructions stored thereon that when executed by one or more processors cause the one or more processors to perform a method comprising: receiving a request for access to a resource; identifying an authentication policy associated with the resource, where the authentication policy includes a multi-level and multi-factor challenge method to be used to authenticate a user for access to the resource; determining a first level of the multi-level and multi-factor challenge method for authentication is completed, which generated an access session for the user; selecting a second level of the multi-level and multi-factor challenge method that has not been completed for the authentication; identifying a factor associated with completing the authentication of the second level based on the multi-level and multi-factor challenge method; determining that the user is not enrolled for the factor; providing a user interface understandable code as an enrollment form to the user via a user interface for inline enrollment of the user for the factor, wherein the user interface understandable code is provided while maintaining validity of the access session; once the inline enrollment of the user for the factor is completed, collecting a credential for the factor from the user; determining the credential collected for the factor is valid; and authenticating the user for the second level based at least on the credential collected for the factor being valid.

In some embodiments, the method further includes creating a context and request object for the request, wherein the context and request object includes; performing an operation on the context and request object, wherein the operation includes calling a handler based on the factor; and determining, by the handler, whether the credential collected for the factor is valid.

In some embodiments, the method further includes intercepting, by an enrollment decorator, the call to the handler prior to the call reaching the handler; and determining, by the enrollment decorator, whether the user is enrolled for the factor.

In some embodiments, the method further includes once the user is determined not to be enrolled for the factor, invoking a user interface mapper that maps the factor to the user interface understandable code; and updating the context and request object to include information pertaining to the enrollment in the factor and the collection of the credential for the factor.

Optionally, the determining, by the handler, whether the credential collected for the factor is valid includes evaluating the context and request object for the information pertaining to the collection of the credential for the factor. Further optionally, the determining, by the enrollment decorator, whether the user is enrolled for the factor includes evaluating the context and request object for the information pertaining to the enrollment in the factor.

The foregoing, together with other features and embodiments will become more apparent upon referring to the following specification, claims, and accompanying drawings.

DETAILED DESCRIPTION

Figure 1:
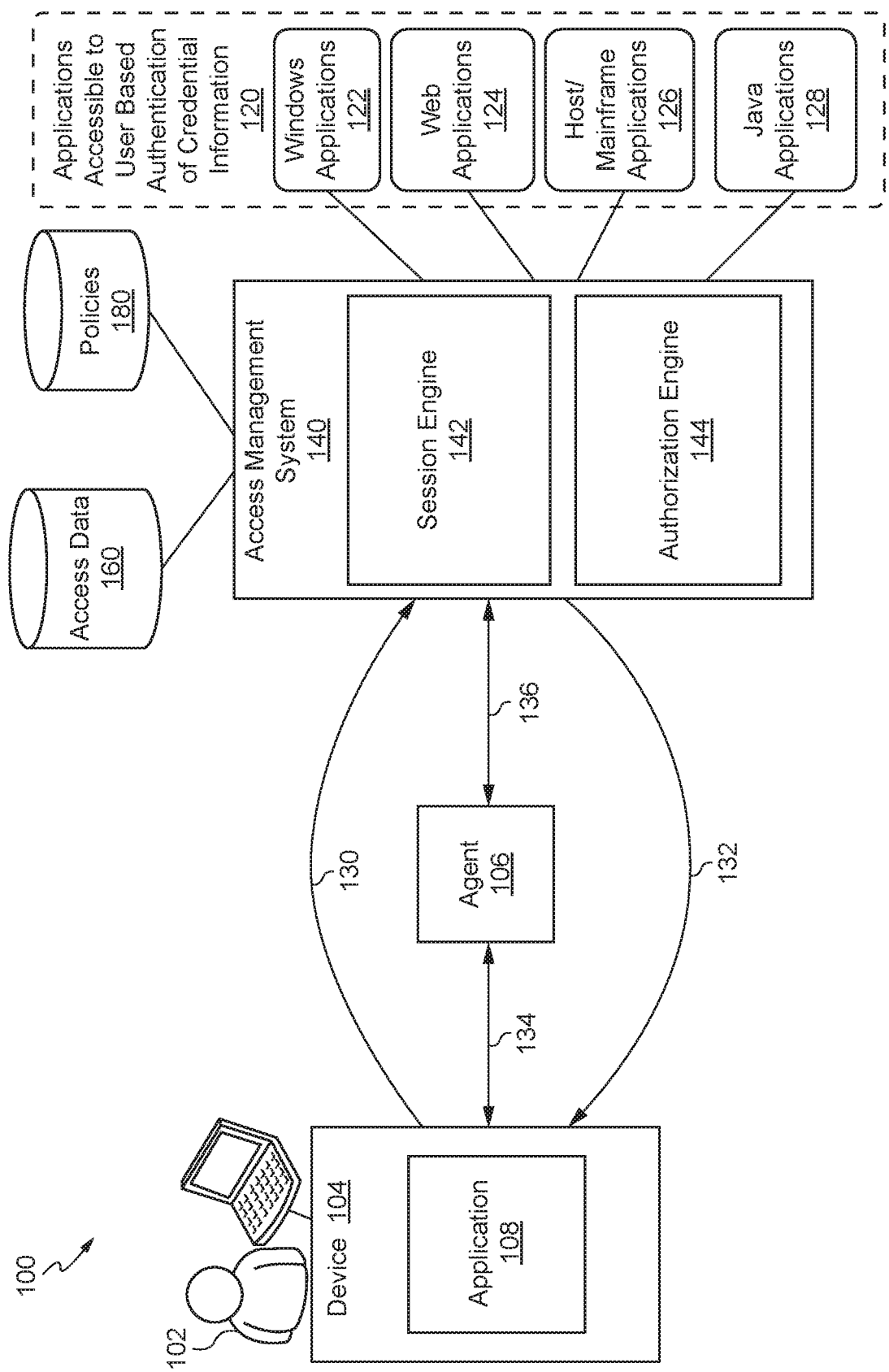
FIG. 1 illustrates a high-level diagram of a system for managing SSO access to resources in accordance with various embodiments.

In the following description, for the purposes of explanation, specific details are set forth in order to provide a thorough understanding of various embodiments described herein. However, it will be apparent that the various embodiments may be practiced without these specific details. The figures and description are not intended to be restrictive.
Introduction The present disclosure relates generally to access control, and more particularly, to techniques (e.g., systems, methods, computer program products storing code or instructions executable by one or more processors) for inline enrollment in multi-level and multi-factor authentication of a user allowing login on a restricted website, or on an enterprise network with single sign-on, or on various other service systems with security restrictions. Today, resource computer systems require multiple levels (multi-level) of authentication and different types of authentication factors (multi-factor) before allowing the user to access a protected resource. The protected resource may be identified by a uniform resource locator (URL), uniform resource identifier (URI), or other data indicating a source (e.g., the one or more resource computer systems) of the resource. Along with that, adaptive access capabilities force the user to complete multiple authentication and authorization schemes before accessing the protected resources. The resource computer systems typically define policies with rules to indicate the level and factor(s) of authentication required for accessing each resource, and those policies may be static or updated dynamically to control access based on real-time events.

For example, in a first instance where a user is trying to access a "BankAccount" resource, which requires a first level of authentication with username and password, the banking system has to prompt the user for the username and password. If the user is not enrolled or registered, then the user will be prompted to enroll or register for an account, which may include setting up a username and password for the account. In a second instance where a user is trying to access a "TransferMoney" resource, which requires a second level of authentication with username and password and second factor (a pin code sent via short message service (SMS) or a security question), the banking system has already prompted the user for the username and password (to first gain access to the account), and now the banking system has to prompt the user for the pin code or the answer to the security question (to execute a transfer). If the user is enrolled or registered for an account but has not yet set up their second factor authentication then the user will be prompted to set up their second factor authentication, which may include answering one or more security questions and/or registering a mobile device to receive SMS messages. Now assume in a third instance, a user is trying to access a "Withdraw" resource, which requires a second level of authentication with username and password, and third factor (a biometric such as a fingerprint). The banking system has already prompted the user for the username and password and a second factor authentication to execute a money transfer, and now the banking system has to prompt the user for a fingerprint for a third factor. If the user is enrolled or registered for an account but has not set up their third factor authentication then the user will be prompted to set up their third factor authentication, which may include providing a fingerprint. As should be understood, problems associated with multi-level and multi-factor authentication is the challenge of obtaining enrollment or registration in all the levels and/or factors required for the resources the user is trying to access, especially in a dynamic setting in which policies may be changing and thus the levels/factors may also be changing.

To address these problems, techniques are disclosed to enable an access management system to initiate an inline enrollment process in order to provide access to resources. The access management system is configurable to determine whether a user has previously enrolled for the required authentication levels or factors, and when the user has not previously enrolled for the required authentication levels or factors, initiate an inline enrollment process to complete the enrollment in the required authentication levels or factors before continuing with authentication validation. As used herein, the term "inline enrollment" means an enrollment process within a valid access session, for example a single sign-on session, that allows a user to enroll in one or more levels or factors of authentication to access one or more resource computer systems. A session, or an access session, provides a user with access to one or more resource computer systems after verification of (e.g., authentication) the credential information (e.g., the multiple factors such as user name, password, time-based one-time password, tokens, client certificates, etc.). The inline enrollment process is different from conventional systems that redirect a user out of a current access session to complete an enrollment process in one or more levels or factors of authentication, and then once the user has enrolled in all level or factors necessary to access the resource, the user has to re-request access to the resource computer system, which starts a new access session for authentication and access.

In an aillustrative embodiment, a method for an inline enrollment process is provided comprising receiving, at a controller, a request for access to a resource, wherein the request is received from a user during an single sign-on session; identifying, by the controller, an authentication policy associated with the resource; identifying, by the controller, an authentication level for the resource and two or more authentication factors required for access to the resource based at least one the identified policy; determining, by an enrollment discriminator, the user is not enrolled for at least one of the two or more authentication factors; executing, by the enrollment discriminator, an enrollment process for the at least one of the two or more authentication factors by the user in the single-sign-on session; receiving, by the controller, the at least one of the two or more authentication factors by the user in the single-sign-on session; and redirecting, by the controller, the user to access the resource in the single-sign-on session.

Control Access System

The various embodiments described herein may be used in an assortment of different domains and contexts. Certain embodiments are particularly applicable to enterprise application software provided in cloud computing technology. However, the systems and methods described herein may be used to provide access control functionality for any system or application framework that relies on an access manager server for controlling access to resources in a distributed environment.

Techniques (e.g., systems, methods, and machine-readable media) are disclosed to enable an access management system to initiate an inline enrollment process in order to provide access to resources. FIG. 1 illustrates a system 100 in which access to resources in a session can be modified such that the a user can be enrolled or registered in a multiple levels and/or multiple factors during a same session. It may be desirable to perform inline enrollment or registration so as to provide access to resources protected by multiple level and/or multiple factors of authentication without having to end a user's session for a separate registration process, which can be irritating to a user.

For purposes of illustration, "session" as described herein includes a session, or an access session, which provides a user with access to one or more resources. Sessions disclosed herein may be referred to, for example, as an SSO session, an authentication session, or any other type of session that provides access to a user. Any type of session described herein is intended as a session providing access to one or more resources. A session may include other types of sessions enabling access to a user. Access management system 140 may provide access to one or more resources. Access management system 140 may implement a sign-on system, e.g., a SSO system, which enables a session to provide SSO access to one or more resources.

Resources may include, without restriction, a file, a web page, electronic content, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. As used herein, when an action is "triggered by" or "based on" something, this means the action is triggered or based at least in part on at least a part of the something. Resources may be stored and/or managed by one or more computer systems, e.g., a resource computer system. A resource computer system may facilitate or control access to one or more resources upon authentication of a user. A session, such as a SSO session, may enable a user to access resources based on authentication of a user a single time.

User 102 operating a device (e.g., device 104), may be presented one or more interfaces (e.g., a graphical interface or a physical interface) that accept input to enable a user 102 to interact with an access management system (e.g., access management system 140). Device 104 may be a client device. Examples of device 104 include, without restriction, a workstation, personal computer (PC), laptop computer, smart phone, wearable computer, or other networked electronic device. An interface presented at device 104 may be accessible using an application, e.g., application 108, executing on device 104. Some embodiments disclosed herein may be implemented by one or more communications 130 from device 104 to access management system 140, and one or more communications 132 from access management system 140 to device 104. Client devices and access management system 140 may communicate via one or more communication networks. Examples of communication networks may include a mobile network, a wireless network, a cellular network, a local area network (LAN), a wide area network (WAN), other wireless communication networks, or combinations thereof.

In at least one embodiment, user 102 may request access to one or more resources 120 that are protected by authentication schemes, which require enrollment or registration in multiple levels and/or multiple factors of authentication. Device 104 may provide an interface via application 108 to enable user 102 to enroll or register for the multiple levels and/or multiple factors of authentication. In some embodiments, the access management system 140 is configurable to determine whether user 102 has previously enrolled for the required authentication levels or factors, and when the user 102 has not previously enrolled for the required authentication levels or factors, initiate an inline enrollment process to complete the enrollment in the required authentication levels or factors before continuing with authentication validation. Upon initiating the inline enrollment process to complete the enrollment process, the access management system 140 may contact a user interface mapper to map the authentication scheme for the protected resource (e.g., a factor) to a user interface understandable code, and forward the user interface understandable code to the client device 104 to invoke the proper user interface for enrollment.

Access management system 140 may be implemented by a computer system. The computer system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof. Access management system 140 may be implemented as an Oracle Access Manager (OAM), provided by Oracle® corporation.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session engine 142 and authorization engine 144, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on one or more processors, cause the one or more processors to perform the operations disclosed herein.

FIG. 1 shows an example in which user 102 can engage in communication with access management system 140 to access one or more protected resources that require enrollment in multiple levels and/or multiple factors of authentication. In this example, user 102 operating device 104 may attempt to access a resource such as an application 108, e.g., any one of applications 120 or the resources accessible through applications 120. One or more of applications 120 may be accessible to user 102 upon successful authentication of credential information for user 102. Access to an application may be based on an authentication level and/or authentication factors for which user 102 authenticates. Access to the resources, such as applications 120, may be controlled by varying authentication schemes based on an authentication level and/or authentication factors for controlling access to each of the resources.

To enable one of applications 120 to be accessed by user 102 at device 104, user 102 may be requested to authenticate to establish a session (e.g., a SSO session) that provides user 102 with access to the applications 120. Device 104 may initiate an authentication process by requesting access from access management system 140. The authentication process may include device 104 displaying one or more GUIs to receive credential information of a user and submitting a request for authentication to access management system 140. Authentication may be established based on verifying user's 102 credential information for authentication defined for the resource which is requested for access. In attempting to access an application, user 102 may operate an application (e.g., application 108) that manages access to a user's account via access management system 140. For example, application 108 is an access management application that may present GUIs. Using application 108, user 102 may request access to one or more resources, engage in authentication, and request modification of an authentication level.

Communications between device 104 and access management system 140 can be received through a gateway system. The gateway system may support access management services. For example, a single sign-on (SSO) gateway may implement one or more access agents, such as agent 106 (e.g., web gate agent), to balance and/or handle requests from clients and access management system 140. Device 104 may send/receive one or more communications 134 to/from agent 106 to facilitate access by device 104 to one or more resources. Access management system 140 may send/receive one or more communications 136 to/from agent 106 to facilitate access by device 104 to one or more resources.

Resources (e.g., applications 120) may be accessible to user 102 based on successful authentication of credential information. Upon receiving the credential information, session engine 142 may verify whether a requested resource, e.g., application 108, is a protected resource that requires credentials for access. Session engine 142 may determine whether access to a resource is protected. Upon determining that the resource is not protected, session engine 142 may grant access to a resource. Upon determining that access to a resource is protected, session engine 142 may determine authentication of user 102 based on the credential information. Specifically, session engine 142 may collect credential information for multiple-levels and/or multiple factors of authentication and the session engine 142 may verify whether the credential information matches credential information registered for enabling user 102 to access the resource. Upon determining authentication of user 102, authorization engine 144 may determine whether user 102 is authorized to access a resource based on access permitted to user 102. Session engine 142 may send a communication to device 104 to indicate an authorization of the user as to whether user 102 is permitted to access the resource. Application 108 may be enabled as a resource accessible to user 102 upon determining that user 102 is authorized to access the resource.

Access management system 140 may provide many access management services including management of access (e.g., granting/denying access) to resources, automatic sign-on, application password change and reset, SSO management, session management, application credential provisioning, as well as authentication of a session. In some embodiments, access management system 140 can provide automatic SSO functionality for applications 120, such as Windows® applications, Web application, Java® applications, and mainframe/terminal-based applications running or being accessed from client devices. As explained above, access management system 120 may perform authentication of a user (e.g., user 102) operating a client device (e.g., device 104). Authentication is a process by which a user verified to determine that he/she is who he/she claims to be.

In some embodiments, access management system 140 may use one or more policies stored in a data store 180 ("policies") to control access to resources. Policies 180 may include an authentication policy that specifies the authentication methodology to be used for authenticating the user for whom the access must be provided on a given resource. Policies 180 define the way in which the resource access is to be protected (e.g., type of encryption, or the like). Policies 180 may include an authorization policy that specifies the conditions under which a user or group of users has access to a resource. For example, an administrator may only authorize certain users within a group to access particular resources. Access management system 140 may determine authentication for a session based on one or more of policies 180.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 may be coupled to or includes one or more data stores for storing data such as access data 160 and policies 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 142 may handle processing to determine whether a valid session exists for user 102 to access a resource that is protected. Access to a protected resource may be controlled based on authentication, or verification of credential information, of a user. Access management system 140 may store data in access data 160 related to managing access to resources. For example, access data 160 may include user profile information including the enrollment or registration status for each of the level(s) and factor(s) required for access to one or more resources, session information for a session established to access one or more resources, and data about authentication of a user for the session. The data about authentication may indicate an authentication level at which the user is authenticated and the resources for which the user is authorized to access at the authentication level. In some embodiments, the data about authentication may indicate resources for which the user is authorized to access at any authentication level less than, or below, the authentication level for which the user is authentication.

Session engine 142 can check for a valid session for user 102 to access a requested resource that is protected. Session engine 142 may assess validity of a session for user 102 based on consideration of one or more access policies applicable to user 102. Session engine 142 may query access data 160 to determine whether session information is stored for a user, and whether the session information indicates that a session is valid. Session engine 142 may assess the access data to determine whether authentication of a user for the session permits the user with authorization to access a requested resource. Based on determining that a valid session does not exist for user 102, session engine 102 may request 108 credential information ("credentials") from user 102. Successful authentication of the credential information may provide the user with access to one or more resources, which may include a requested resource.

Request 108 may be communicated to device 104, which in response, prompts user 102 for user credentials to determine authentication of a session. Request may include information (e.g., a URL) to a web page or a user interface (e.g., a web page, portal, or dashboard) to receive credential information. Request 108 may be communicated to device 104, which in response, prompts user 102 for user credentials to determine authentication of a session.

Session engine 142 may perform operations to authenticate credential information for user 102. In some embodiments, session engine 142 may store information about sessions established upon successful authentication of a user. For example, session engine 142 may store session information in access data 160 about a session established as a SSO session using SSO techniques. The session information may include access information for enabling SSO access to multiple resources accessible to user based upon successful authentication of credential information for a user.

In some embodiments, session engine 142 may communicate with authorization engine 144 regarding the scope of authentication. Session engine 142 can send the scope information received from device 104 to authorization engine 144. Authorization engine 210 can determine resources that are protected and based on authentication sessions 150, can determine resources that are permitted and/or restricted for a session.

In some embodiments, access management system 140 may be implemented in system 100 according to an agent-server model for communication between device 104 and any one of access manager servers implemented for access management system 140. The agent-server model may include an agent component (e.g., a gateway system) and a server component. The agent component may be deployed on a host system and the server component may be deployed on a server, e.g., an access manager server, implementing using a server computer. User 102 operating device 104 may communicate with access management system 140 via agent 106 using an enterprise computer network.

Agent 106 may provide access control and may operate to protect access management system 140 and any resources accessible through access management system 140 against external and internal web-based threats. Access management system 140 may communicate with one or more resource computer systems (e.g., resource servers) that provide access to one or more resources, e.g., applications 120. A resource computer system may be managed by a party not associated with access management system 140. For example, a resource computer system may be a third-party service provider that provides access to resources, such as email. Agent 106 may implement or operate as an agent component for access management system 140 and may include a computer system that operates as a server component for access management system 140.

Each resource accessible by access management system 140 may be protected through an agent, e.g., agent 106. Agent 106 may intercept user requests for one or more resources protected by it and verify authentication of the user(s). The agent may contact access management system 140 to verify whether a resource is a protected resource for which access is controlled by authentication. If the access management system 140 determines that the resource is not protected, agent 106 may grant access to user 102. If the resource is protected, agent 106 may request user 102 to provide authentication credential information.

In some embodiments, communication 136 between agent 106 and access management system 140 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 140. Each channel may communicate using an access token designed for the type of communication over the channel. The access flow may generate two types of browser tokens. A first token is an access management ID token (e.g., OAM ID token), which serves the SSO requests that are being propagated over HTTP. A second token is an authorization token (e.g., OAM Authn Token) that may be used to server the SSO requests that are being propagated over OAP. The browser tokens may be stored as host cookies at device 104.

Access management system 140 (e.g., using agent 106) may request user 102 for authentication credentials in the form of a challenge (e.g., via the user's web browser at device 104). In some embodiments, user 102 can access an interface through a client (e.g., application 108) executing on device 104 or through a web browser on device 104. The interface may be implemented at access management system 140. Access management system 140 may send, with request 108, the interface or information (e.g., a URL) enabling access to the interface.

In some embodiments, an interface can include a list of the applications user 102 commonly utilizes. User 102 can manage their credentials and policies associated with applications through the interface. When user 102 requests to access an application, e.g., application 108, through the interface, a request may be sent from device 104 to access management system 140 to determine a policy type for the application from one or more policies applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent 106 can enable users to access any of applications 120 using services provided by access management system 140. Access may be provided through a web browser directly, without first accessing the interface or using a client executing on device 104. If user 102 is not authorized, then access management system may request 108 credentials from user 102. The interface may receive input including credential information. The credential information may be sent to access management system 140 to determine authentication of user 102.

In some embodiments, credential types can be supported, such as protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For protected resources, user requests can be authenticated and then directed to URLs associated with the requested resources. For federated applications, links to federated partners and resources can be provided, including business to business (B2B) partner applications and SaaS applications. For form fill applications, templates can be used to identify fields of application web pages through which credentials can be submitted.

Access management system 140 can perform inline enrollment of a user in an access session based on multi-level and multi-factor authentication challenge methods or schemes. In some embodiments, an authentication policy includes a multi-level and multi-factor authentication challenge method or scheme to be used to authenticate a user for access to the resource. The multi-level and multi-factor authentication challenge method or scheme may dictate a required level of authentication for a requested resource. The multi-level and multi-factor authentication challenge method or scheme may be defined for the level of authentication based on a resource type, a time period, a specific user, or other criteria related to an access session. The authentication policies may be stored in data storage such in a data store 180 ("policies"). In certain embodiments, an administrator may define various resource protection rules of the multi-level and multi-factor authentication challenge method or scheme via policy as demonstrated below:

```
{
    {
        "resource" : "MyProfile",
        "authenticationLevel": "Level2"
    },
    {
        "resource" : "MyInfo",
        "authenticationLevel": "Level1"
    },
    {
        "resource" : "UpdateProfile",
        "authenticationLevel": "Level3"
    }
}
```

The multi-level and multi-factor authentication challenge method or scheme may also dictate one or more factors required for each level of authentication for a requested resource. For example, an administrator may define various factors for each of the authentication levels in one or more data structures as a matrix [rows that represent level of authentication (i), columns that represent factor(s) to be used for authentication at each level (j)] as demonstrated in Table 1:

| Level of authentication/ Factors | UserName & Password | SMS Email One time password | PUSH Push auth | TOTP time-based one-time password | Security Questions | USB Tokens/ Client Certificate | SAML Security Assertion Markup Language | Personal Identifier (social security number) | Biometric |
|---|---|---|---|---|---|---|---|---|---|
| Level 1 | Yes | No | No | No | No | No | Yes | Yes | No |
| Level 2 | No | No | No | Yes | Yes | No | No | No | No |
| Level 3 | No | Yes | Yes | No | No | Yes | No | No | No |
| Level 4 | No | No | No | No | No | Yes | No | No | Yes |

The matrix may be written as a component of the policy or stored separately in data storage such as in a data store 180 ("policies"). The multi-level and multi-factor approach requires a user to present at least one factor of identification from a set of factors potentially including: (1) a knowledge factor; (2) a possession factor; and/or (3) an inherence factor for each level. The knowledge factor refers to something the user knows, for instance a password, pin code or passphrase; the possession factor refers to something the user owns, for instance a security fob, a magnetic card, a cell phone, or a tablet computer; and the inherence factor refers to something the user is. The inherence factor could be determined using biometrics such as fingerprint, iris or voice analysis. The levels are shown being sequential with the lowest level, or first level (Level 1), being the least secure, the second level (Level 2) being more secure, and the highest level (Level 4) being the most secure. Moreover, the factors are shown as only requiring one of the factors for each level. However, it should be understood that any type of matrix could be defined to establish a relationship between the multi-levels and the multi-factors. For example, the first level of the multi-level and multi-factor challenge method for authentication does not necessarily have to be less secure than the second level of the multi-level and multi-factor challenge method. Instead, the levels may be independent of one another and not represent a hierarchical representation of security (e.g., from least to most). Moreover, each level may require one or more factors for authentication. For example, one or more factors of the multi-level and multi-factor challenge method for authentication may be used individually or in combination to satisfy the requirements for each level.

Inline Enrollment Framework

Figure 2:
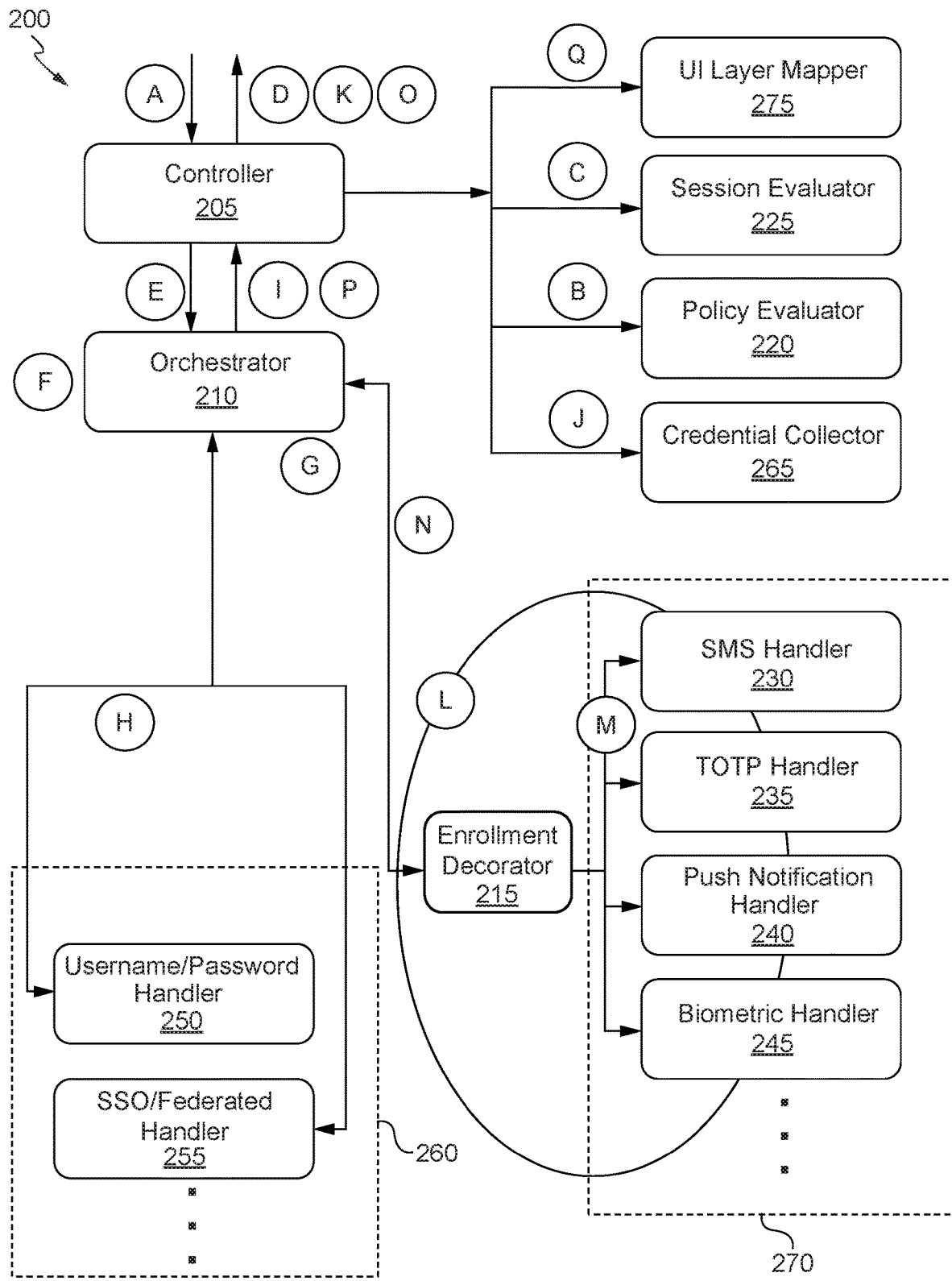
FIG. 2 illustrates a high-level diagram of an example of a SSO session managed within a distributed environment that includes an additional framework that allows the user to complete inline enrollment in multi-level and multi-factor authentication in accordance with various embodiments.

In various embodiments, systems, methods, and computer-readable media are disclosed for authentication of a user on a restricted website, or on an enterprise network with single sign-on, or on various other service systems with security restrictions using inline enrollment of a user in an access session based on multi-level and multi-factor authentication challenge methods or schemes. FIG. 2 illustrates a framework for the inline enrollment in accordance with an exemplary embodiment using access management system 200 (e.g., access management system 140 described with respect to FIG. 1). Specifically, system 200 may be configured to provide inline enrollment for multi-level and multi-factor authentication within a distributed environment using a controller 205, orchestrator 210, and enrollment decorator 215, each of which may be implemented in hardware, software (e.g., program code, instructions executable by a processor) executing on hardware, or combinations thereof. In various embodiments, the controller 205, orchestrator 210, and enrollment decorator 215 are components of a session engine (e.g., the session engine 142 described with respect to FIG. 1) that enables the access management system to perform the inline enrollment and provide access to one or more resources.

In some embodiments, a client device is used by a user to request access to a resource. Typically, an access request can be for WEB resources using a Uniform Resource Locator (URL) (e.g., WEB URL resources accessed in an Internet-based hypertext system) or can be for API resources (e.g., API resources accessed on a server that employs Representational State Transfer (REST) constraints (i.e., REST API resource)) using an endpoint URL and uniform and pre-defined set of stateless operations. WEB and REST resource access may be initiated using web browsers or HTTP clients simulating a browser interaction model. At step A, the browser or simulator invokes the controller 205 to initiate and complete an authentication process for access to the resource. In embodiments in which the resource is a WEB resource, the controller 205 operates as an SSO controller. In embodiments in which the resource is a REST resource, the controller 205 operates as a REST handler. At step B, the controller 205 communicates with a policy evaluator 220, to evaluate an authentication policy. The policy evaluator 220 may identify and return to the controller 205 an authentication policy based on a type of resource being request by the user. The authentication policy may be defined to dictate a required level of authentication for the requested resource. In some embodiments, the authentication policy includes a multi-level and multi-factor challenge method to be used to authenticate a user for access to the resource.

At step C, the controller 205 communicates the policy to a session evaluator 225 to evaluate the validity of the existing session based on consideration of requirements in the authentication policy. For example, the controller 205 may invoke the session evaluator 225 to check if a current level of authentication for the user in the present session meets the level of authentication requirements in the authentication policy. When the session is valid or the current level of authentication for the user meets the level of authentication requirements in the authentication policy, then at step D the controller 205 returns to the browser of the client device a success message and provides access to the resource. Alternatively, when the session is invalid (e.g., the session cookie has expired) or the current level of authentication for the user does not meet the level of authentication requirements in the authentication policy, then at step E the controller 205 communicates with the orchestrator 210 to complete authentication. For example, the session evaluator 225 may determine that a first level of the multi-level and multi-factor challenge method for authentication is completed, which generated an access session of the user. In certain embodiments, generating the session includes creating one or more session cookies. However, the session evaluator 225 may also determine that a second level of the multi-level and multi-factor challenge method has not been completed for the authentication, and thus controller 205 communicates with the orchestrator 210 to complete authentication of the second level for access to the resource.

In some embodiments, the orchestrator 210 receives policy information and context information from the controller 205 and starts one or more orchestrations to complete authentication of the user. In access manager system 200, an action performed by a user or system may be called an operation. Examples of operations are creating users, modifying roles, creating authentication or authorization policies, authenticating users, and authorizing users. The process of an access manager system 200 operation that goes through a predefined set of stages and executes some business logic in each stage is called an orchestration. The type of object that is changed by the orchestration is called an orchestration target. The data that is required to carry out the orchestration operation is called orchestration parameter. The policy information and the context information may be part of the data or orchestration parameters used to carry out the orchestration for completing authentication. The policy information may include the policy requirements (e.g., the multi-level and multi-factor challenge method) for access to the resource. For example, the policy information may include the level of authentication required to access the resource. The context information includes the identity of an orchestration target or context and request object for the user. The context and request object may be created by the agent or controller 205 and includes a status of the user such as their present authentication level in the session, enrollment in the levels or factor of authentication, and any authentication credentials collected from the user.

In some embodiments, the orchestrator initializes orchestration status for completing authentication on the orchestration target or the context and request object. Each operation performed by the orchestrator 210 on the orchestration target can have consequences for users or other entities. For example, executing an authentication policy can result in a grant or denial of access to a protected resource; initiate an enrollment or registration for a multi-level and multi-factor challenge method through an inline enrollment process; or redirect users to an out of session authentication service. Each consequence is represented as an orchestration. The consequences of some operations can be customized, such as create, modify, delete, validate, invalidate, enable, disable, redirect, lock, and unlock users, by writing event handlers. An event handler may be a piece of code that is registered with an orchestration on various stages. The event handlers are invoked when the relevant orchestration stage is performed. Event handlers can either be asynchronous or synchronous. A synchronous event handler returns with a response right away, whereas an asynchronous event handler completes at a later stage. An event handler can be conditional, which means that the event handler is executed when certain conditions are satisfied.

In some embodiments, the event handlers are conditional and are executed when certain levels and/or factors of authentication are identified for a resource in the authentication policy associated with the resource. In certain embodiments, the event handlers include a handler for each of the factors used in authentication. For example, the handlers may include a Short Message Service (SMS) handler 230, which may be used for gathering and validating single-sing on authentication credentials, a Time-based One-Time Password (TOTP) handler 235, which may be used for gathering and validating one time password credentials, push notification handler 240, which may be used for gathering and validating push notification credentials, a biometric handler 245, which may be used for gathering and validating biometric credentials such as fingerprints or voice recognition, username and password handler 250, which may be used for gathering and validating username and password credentials, and a SSO or federated handler 255, which may be used for gathering and validating SSO or federated credentials such as a certificate.

At step F, the orchestrator 210 performs validation and preprocessing operations on the context and request object to determine the level(s) and factor(s) required for access to the resource. For example, the orchestrator 210 evaluates the policy information including the multi-level and multi-factor challenge method to determine the level(s) and factor(s) required for access to the resource. In certain embodiments, the rules of the policy are evaluated in view of a data structure, for example, the matrix [rows that represent level of authentication (i), columns that represent factor(s) to be used for authentication at each level (j)] described with respect to FIG. 1. The policy information informs the orchestrator 210 which level(s) are required for access to the resource and which factor(s) may be used for authentication at each level required for the access. For example, with reference to Table 1, if a user is trying to access a resource type that is identified by an authentication policy as being level one, then the user must provide one of: (i) a user name and password, (ii) a SAML, or (iii) a personal identifier. Alternatively, if a user is trying to access a resource type that is identified by an authentication policy as being level two, then the user must provide one of: (i) a user name and password, (ii) a SAML, or (iii) a personal identifier for level one AND one of: (i) a TOTP or (ii) security question for level two. Alternatively, if a user is trying to access a resource type that is identified by an authentication policy as being level three, then the user must provide one of: (i) a user name and password, (ii) a SAML, or (iii) a personal identifier for level one; AND one of: (i) a TOTP or (ii) security question for level two; AND one of: (i) an SMS, (ii) a PUSH, or (iii) a certificate/token for level three. Alternatively, if a user is trying to access a resource type that is identified by an authentication policy as being level four, then the user must provide one of: (i) a user name and password, (ii) a SAML, or (iii) a personal identifier for level one; AND one of: (i) a TOTP or (ii) security question for level two; AND one of: (i) an SMS, (ii) a PUSH, or (iii) a certificate/token for level three; AND a certificate/token for level four. As should be understood, the levels and factors used in the above example are not limiting and can be configured in any manner desired using the authentication policies and data structure. For example, the levels do not need to be dependent on one another and instead may be independent of one another such that a user does not have to be verified for each prior or subsequent level in the data structure.

In some embodiments, the validation and preprocessing operations further include identifying and selecting the next level or factor to be verified for authentication. The validation and preprocessing operations may include determining a first level of the multi-level and multi-factor challenge method for authentication is completed, selecting a second level of the multi-level and multi-factor challenge method that has not been completed for the authentication, and identifying a factor associated with completing the authentication of the second level based on the multi-level and multi-factor challenge method. The validation and preprocessing operations may further include comparing the levels and factors of authentication already completed by the user to the levels and factors of authentication required by the multi-level and multi-factor challenge method. The orchestrator 210 may make a determination as to whether there are any levels or factors of authentication that need to be completed to complete authentication based on the comparison between the levels and factors of authentication already completed by the user to the levels and factors of authentication required by the multi-level and multi-factor challenge method. When the levels and factors of authentication already completed by the user match the levels and factors of authentication required by the multi-level and multi-factor challenge method, then the orchestrator 210 may determine whether authentication is a success. In some embodiments, success is determined based at least on the current levels and factors of authentication for the user satisfying the multi-level and multi-factor challenge method. In certain embodiments, success is also determined based on a valid session. For example, a session may be valid when the a cookie is present and has not timed-out or expired.

When the levels and factors of authentication already completed by the user do not match the levels and factors of authentication required by the multi-level and multi-factor challenge method, then the orchestrator 210 determines the levels and factors of authentication that are incomplete and selects a level the multi-level and multi-factor challenge method for completion. Once the incomplete level is selected, an authentication implementation is identified for the selected incomplete level and a process method is invoked on the authentication implementation. In some embodiments, identifying the authentication implementation includes identifying a factor associated with completing the authentication of the selected level based on the multi-level and multi-factor challenge method. Alternatively, when the levels and factors of authentication already completed by the user do match the levels and factors of authentication required by the multi-level and multi-factor challenge method, then the orchestrator 210 returns the process to the controller 205, which returns the process to the agent and provides, to the client device, a success message and access to the resource.

At step G, the orchestrator 210 performs one or more operations (i.e., the process method) on the authentication implementation for the selected level. In various embodiments, the one or more operations include calling or invoking the one or more handlers, for example, SMS handler 230, TOTP handler 235, push notification handler 240, biometric handler 245, username and password handler 250, and/or SSO or federated handler 255, for the factor identified for the selected incomplete level. When the orchestrator 210 calls or invokes respective handlers (e.g., the username and password handler 250 and/or SSO or federated handler 255) to handle the request, the handlers will evaluate the context and request object to complete the authentication. Upon evaluation, if the information present in the context and request object is enough to complete authentication then the handlers will validate the session and/or credentials. For example, each handler will compare a status of the user such as their present authentication level in the session and any authentication credentials collected from the user to the requirements for the factor controlled by the handler to determine whether the user satisfies the requirements for the factor (e.g., the user has supplied a username and password for the username/password requirement). If the present authentication level in the session and/or any authentication credentials collected from the user satisfy the requirements for the factor (e.g., the username and password match the username and password on record for the user), then the session and/or credentials for the factor will be validated. Otherwise, the handler will return the response to the orchestrator 210 to initiate a process to collect the required credentials from the user.

As illustrated in FIG. 2, the call or invocation may proceed directly to the one or more handlers 260 at step H. In some embodiments, a base level or single level of authentication (e.g., the first level) and any associated factors such as username and password; SAML, or personal identifier are not available for enrollment/registration via the inline enrollment process. For example, the framework for the inline enrollment may be configured to perform conventional enrollment for a base level or single level of authentication and any associated factors. Consequently, when the orchestrator 210 determines a user is trying to access a resource type that is identified by an authentication policy as requiring a base level or a single level of authentication (e.g., level one), then the orchestrator 210 may call or invoke the handlers 260. The base level or single level of authentication may be the least secure level of authentication available via the framework. When the orchestrator 210 calls or invokes the handlers 260 (e.g., the username and password handler 250 and/or SSO or federated handler 255) to process the request, the handlers 260 will evaluate the context and request object to complete the authentication. If the information present in the context and request object is enough to complete authentication (e.g., the present authentication level in the session and/or any authentication credentials collected from the user satisfy the requirements for the authentication factor) then the handlers 260 will validate the credentials. Otherwise, the handlers 260 return the response to the orchestrator 210 to initiate a process to collect the required credentials from the user.

In order to initiate the process to collect the required credentials from the user, the orchestrator 210 performs one or more operations to collect the credentials at step I. In some embodiments, the one or more operations include forwarding the call back to the controller 205 for collection of the credentials from the user. At step J, credential collection is accomplished by the controller 205 calling or invoking a credential collector 265 such as an embedded credential collector or a webgate that provides a switch for a detached credential collector. The mechanism that redirects the user from the policy enforcement point at the controller 205 to the credential collector 265 may be a protocol over HTTP. The protocol provides the context of the resource request and the authentication request with policy information on a query string. The detached credential collector provides network isolation for greater security, and may be required for certain forms of authentication. The credential collector 265 provides a login form via a user interface to the user for the collection of the credentials, which may or may not include out of session enrollment or registration in the base level or single level of authentication and any associated factors. Once the credentials are collected from the user via the user interface, the context and request object is updated to include the credentials and the call may be forwarded back to the orchestrator 210 for further processing as described with respect to steps G and H. If the information present in the updated context and request object is enough to complete authentication (e.g., the present authentication level in the session and/or any authentication credentials collected from the user satisfy the requirements for the authentication factor) then the handlers 260 will validate the credentials. Once the credentials are validated by the one or more handlers 260, the orchestrator 205 forwards the call back to the controller 205, and at step K the controller 205 initializes an access session and returns the authentication decision to the agent with the one or more session cookies such that the agent may grant access to the resource. In some embodiments, the one or more session cookies include an authentication cookie and server cookie to track and maintain the session.

As further illustrated in FIG. 2, the call or invocation may proceed indirectly to the one or more handlers 270 at step L. In some embodiments, multiple levels of authentication (e.g., the second level and the third level) and any associated factors such as SMS, TOTP, biometrics, etc. are available for enrollment/registration via the inline enrollment process. For example, the framework for the inline enrollment may be configured to perform enrollment or registration for multiple levels of authentication and any associated factors within a session (e.g., a session that was previously started upon completion of a first level authentication with a valid session cookie as described with respect to steps F-K). Consequently, when the orchestrator 210 determines a user is trying to access a resource type that is identified by an authentication policy as requiring multiple levels of authentication (e.g., level two and level three), then the orchestrator 210 may call or invoke the handlers 270. In various embodiments, when the orchestrator 210 calls or invokes the one or more handlers 270, the enrollment decorator 215 intercepts the call. The enrollment decorator 215 is superficially similar to an interceptor, but it is configured to implement one or more operations on the context and request object to determine whether the user has already enrolled or registered for a selected level or factor. For example, in an instance where the context and request object does not include information pertaining to the enrollment in the factor, the enrollment decorator 215 may be configured to: access the profile of the user, analyze, in the profile, the enrollment or registration status for the selected level or factor, and determine whether the user is enrolled or registered for the selected level or factor. Alternatively, in an instance where the context and request object does include information pertaining to the enrollment in the factor, the enrollment decorator 215 may be configured to evaluate the context and request object for the information pertaining to the enrollment in the factor.

When the enrollment decorator 215 determines that the user has enrolled for the selected level or factor, the call is forwarded at step M to the one or more handlers 270 for the respective level or factor. The handlers 270 will evaluate the context and request object to complete the authentication. If the information present in the context and request object is enough to complete authentication (e.g., the present authentication level in the session and/or any authentication credentials collected from the user satisfy the requirements for the selected level or factor) then the handlers 270 will validate the credentials. Otherwise, the handlers 270 return the response to the orchestrator 210 to initiate a process to collect the required credentials from the user. In order to initiate the process to collect the required credentials from the user, the orchestrator 210 performs one or more operations to collect the credentials at step I. In some embodiments, the one or more operations include forwarding the call back to the controller 205 for collection of the credentials from the user.

At step J, credential collection is accomplished by the controller 205 calling or invoking a credential collector 265 such as an embedded credential collector or a webgate that provides a switch for a detached credential collector. The mechanism that redirects the user from the policy enforcement point at the controller 205 to the credential collector 265 may be a protocol over HTTP. The protocol provides the context of the resource request and the authentication request with policy information on a query string. The detached credential collector provides network isolation for greater security, and may be required for certain forms of authentication. The credential collector 265 provides a login form via a user interface to the user for the collection of the credentials. Once the credentials are collected from the user via the user interface, the context and request object is updated to include the credentials and the call may be forwarded back to the orchestrator 210 for further processing as described with respect to step L. If the information present in the updated context and request object is enough to complete authentication (e.g., the present authentication level in the session and/or any authentication credentials collected from the user satisfy the requirements for the selected level or factor) then the handlers 270 will validate the credentials. Once the credentials are validated by the one or more handlers 270, the orchestrator 205 forwards the call back to the controller 205, and at step O the controller 205 updates the session (e.g., updates a session cookie to include the validated information), and returns the authentication decision to the agent such that the agent may grant access to the resource.

In contrast, when the enrollment decorator 215 determines that the user has not enrolled for the selected level or factor, the call is forwarded at step N back to the orchestrator 210 for inline enrollment in the selected level or factor. This ensures that the user has already enrolled for the selected level or factor prior to the one or more handlers 270 determining the validity of the credentials. In order to initiate the process for inline enrollment of the user in the selected level or factor, the orchestrator 210 performs one or more operations to inline enroll the user at step P. In some embodiments, the one or more operations include forwarding the call back to the controller 205 for inline enrollment. At step Q, inline enrollment is accomplished by the controller 205 calling or invoking a user interface mapper 275. The mechanism that redirects the user from the policy enforcement point at the controller 205 to the user interface mapper 275 may be a protocol over HTTP. The protocol provides the context of the resource request and the authentication request with policy information on a query string. The user interface mapper 275 maps the level or factor to a user interface understandable code and provides the code as an enrollment form via a user interface to the user for inline enrollment of the user in the selected level or factor, which may or may not include collection of credentials for the selected level or factor. Once the user is enrolled and optionally the credentials are collected from the user via the user interface, the context and request object is updated to include the enrollment information and optionally the credentials, and the call may be forwarded back to the orchestrator 210 for further processing as described with respect to steps L and M. If the information present in the updated context and request object is enough to complete authentication (e.g., the present authentication level in the session and/or any authentication credentials collected from the user satisfy the requirements for the authentication factor) then the handlers 270 will validate the credentials. Processes in steps N-O continue until credentials have been validated for all the determined level(s) and factor(s) required for access to the resource. Once all the credentials are validated by the one or more handlers 270, the orchestrator 205 forwards the call back to the controller 205, and at step O the controller 205 updates the session, and returns the authentication decision to the agent such that the agent may grant access to the resource.

Inline Enrollment Processes

Figure 3:
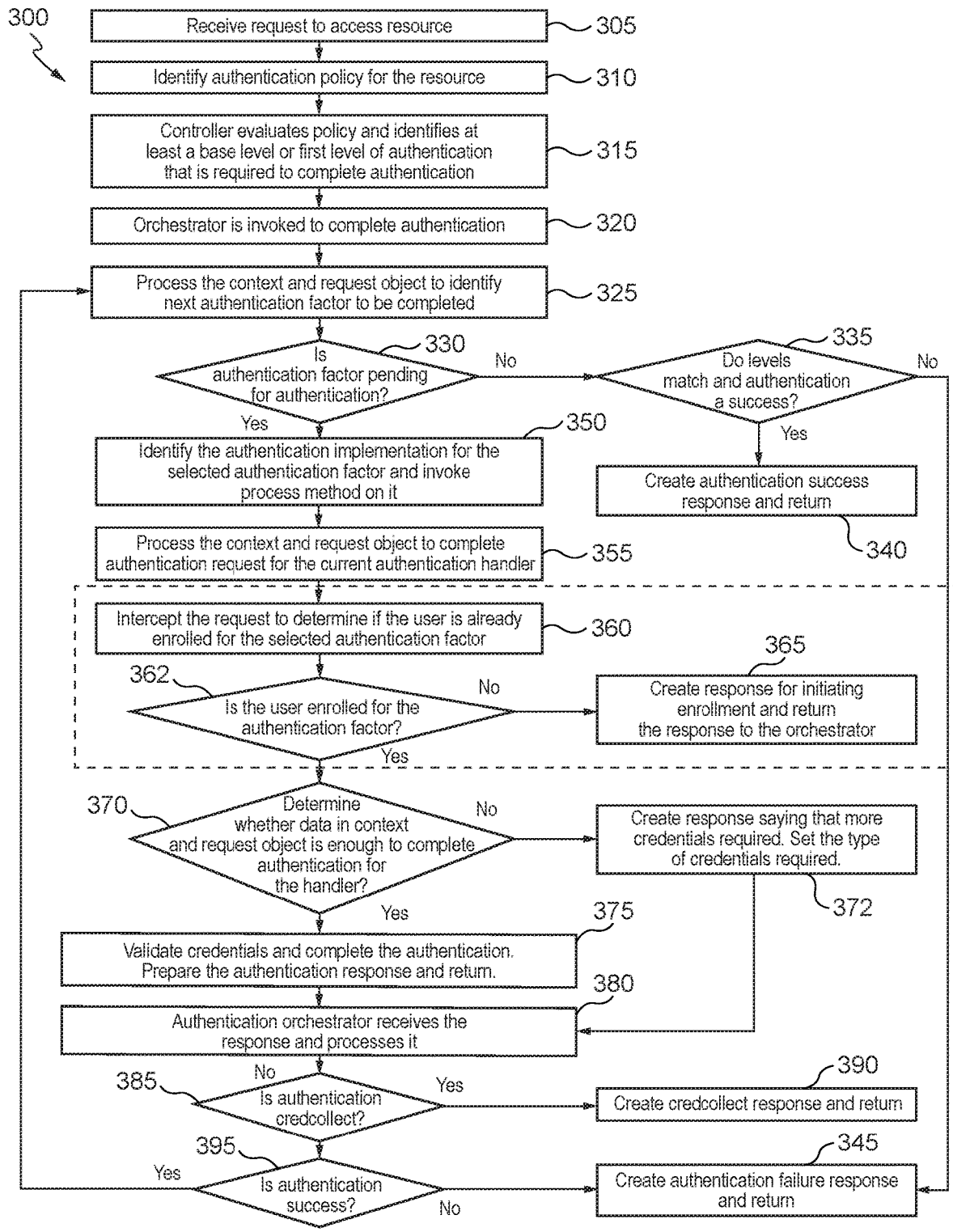
FIG. 3 depicts a flowchart illustrating a process for inline enrollment in multi-level and multi-factor authentication in accordance with various embodiments.

FIG. 3 illustrates a process and operation for inline enrollment of multiple levels and multiple factors of authentication according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 3 is not intended to be limiting. Other sequences of steps may also be performed according to alternative embodiments. For example, in alternative embodiments the steps outlined above may be performed in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart 300 that illustrates a process for inline enrollment of multiple levels and multiple factors of authentication according to various embodiments. In some embodiments, the processes depicted in flowchart 300 may be implemented by the system of FIG. 1 and the framework of FIG. 2. At step 305, a request for access to a resource is received. In some embodiments, users attempt to access a resource using a client device, for example, by entering a URL in a browser, by running an application, running a simulator, or by calling some other external business logic. The client device invokes a controller of an access management system to initiate and complete an authentication process for access to the resource. In some embodiments, communications between the client device and controller can be received through a gateway system. For example, a single sign-on (SSO) gateway may implement one or more access agents, such as webgate agent, to balance and/or handle requests from the client device and access management system. The client device may send/receive one or more communications to/from agent to facilitate access to the resource. Furthermore, the access management system may send/receive one or more communications to/from agent to facilitate access to the resource.

When a user requests access to a resource, the request is evaluated according to policies that discriminate between users who are authenticated and authorized and those who are not authenticated and authorized for access to a particular resource. For example, the access management system may enable resource providers (e.g., an enterprise) to control who can access resources based on policies defined within an application domain. Each application domain provides a logical container for resources, and the associated policies that dictate who can access these resources. An application domain may be created automatically during agent registration or manually using the administrative user interface. Each policy includes a rule that defines whether the policy allows or denies access to resources protected by the policy. For example, a rule may state that level 1 authentication is required for access to the resource. Each rule references conditions that define to whom the rule applies, if there is a time condition, and how evaluation outcomes are to be applied. Each policy may also include the authentication scheme that provides the challenge method to be used to authenticate the user for access to the resource. For example, the authentication scheme may state that for level 1 authentication a valid password and username must be provided. The authentication scheme is a named component of the policy that defines the challenge mechanism, level of trust, and the underlying authentication module or plug-in (e.g., the handler) required to authenticate a user. One authentication scheme may be assigned to multiple authentication policies. However, each authentication policy should have only one authentication scheme assigned to it.

At step 310, an authentication policy associated with the resource is identified. In some embodiments, the controller communicates with a policy evaluator to identify the authentication policy. Each policy identifies the specific resources covered by the policy, which may be defined on the resources tab of the policy and in the resources container for the application domain. The identification may include the policy evaluator searching the policies and application domains for the policy that covers the resource being requested. Once the authentication policy is identified, the policy evaluator returns the authentication policy to the controller for processing in accordance with the rules and authentication scheme. In various embodiments, the identified the authentication policy includes a multi-level and multi-factor challenge method to be used to authenticate a user for access to the resource. At step 315, at least a base level or first level of authentication is determined to be required to access the resource based on the identified policy. In some embodiments, the controller evaluates the policy and determines that at least a base level or first level of authentication is required to access the resource based on the rules and authentication scheme of the policy. At step 320, an orchestration is initiated to complete authentication.

In some embodiments, the controller communicates policy information and context information to the orchestrator to complete authentication. The policy information may include the rules and authentication scheme for access to the resource. The context information includes the identity of an orchestration target such as a context and request object for the user. The context and request object may include a status of the user such as their present authentication level in the session and any authentication credentials collected from the user.

At step 325, the context and request object is processed to identify the next level or authentication factors to be verified for authentication. In some embodiments, the orchestrator initializes orchestration status for performing operations on the context and request object. In some embodiments, the orchestrator performs validation and preprocessing operations on the context and request object to check for the existence of a session (e.g., an SSO cookie) within the context and request object. The validation and preprocessing operations may include determining: (i) whether a session is present for the user, and (ii) the levels and/or factors of authentication already completed by the user for the session. The validation and preprocessing operations may further include comparing the levels and factors of authentication already completed by the user to the levels and factors of authentication required by the rules and authentication scheme in the authentication policy. In some embodiments, the first level of the multi-level and multi-factor challenge method for authentication is determined to be completed, which generated an access session for the user. In other embodiments, the first level of the multi-level and multi-factor challenge method for authentication is determined to not be completed.

At step 330, a determination is made as to whether there are any levels or factors of authentication that need to be completed to complete authentication. In some embodiments, the determination is made based on the comparison between the completed levels and factors of authentication to the levels and factors of authentication required by the rules and authentication scheme in the authentication policy. In some embodiments, the completed levels and factors of authentication may not match the levels and factors of authentication required by the rules and authentication scheme when (i) there are no levels and/or factors of authentication already completed by the user, (ii) the user has completed only some of the levels and/or factors of authentication required by the rules and authentication scheme, and/or (iii) the user has completed the wrong levels and/or factors of authentication required by the rules and authentication scheme.

When the completed levels and factors of authentication match the levels and factors of authentication required by the rules and authentication scheme, then at step 335 a determination is made as to whether authentication is a success. In some embodiments, success is determined based at least on the completed levels and factors of authentication for the user satisfying the rules and authentication scheme. In certain embodiments, success is also determined based on a valid session. For example, a session may be valid when a session cookie is present and has not timed-out or expired. When the completed levels and factors of authentication for the user satisfy the rules and authentication scheme and optionally the session is valid, then at step 340 the process returns to the agent, which provides, to the client device, a success message and access to the resource. In certain embodiments, the authentication policy specifies a success URL that is included in the success message and redirects the user based on the results of this policy evaluation to access the resource. When the completed levels and factors of authentication for the user do not satisfy the rules and authentication scheme or optionally the session is not valid, then at step 345 the process returns to the agent, which provides, to the client device, a failure message. In certain embodiments, the authentication policy specifies a failure URL that is included in the failure message and redirects the user based on the results of this policy evaluation to prompt the user for valid credentials and start a new session.

When the completed levels and factors of authentication do not match the levels and factors of authentication required by the rules and authentication scheme, then at step 350 the levels and factors of authentication that are incomplete are determined and an incomplete level of authentication is selected for completion. In some embodiments, a first level of the multi-level and multi-factor challenge method for authentication is completed, and the thus a second level of the multi-level and multi-factor challenge method is selected that has not been completed for the authentication. In some embodiments, the incomplete level is selected for completion sequentially, for example, level one first, level two second, level three third, etc. For example, if the levels of authentication required by the rules and authentication scheme include three levels of authentication, and the user has only completed a first level of authentication, then the second level of authentication may be selected for completion initially and the third level of authentication may be selected for completion subsequently. In other embodiments, the incomplete level is selected for completion based on a predetermined order defined within the policy. In other embodiments, the incomplete level is selected independent of the completed levels and/or policy, for example, randomly.

Once the incomplete level is selected, an authentication implementation is identified for the selected incomplete level and a process method is invoked on the authentication implementation. In some embodiments, identifying the authentication implementation includes identifying a factor associated with completing the authentication of the selected level based on the multi-level and multi-factor challenge method. For example, the authentication implementation may define various factors for each of the authentication levels in one or more data structures as a matrix [rows that represent level of authentication (i), columns that represent factor(s) to be used for authentication at each level (j)] as demonstrated in Table 1. A factor for completion can be identified using the matrix based on the selected incomplete level. In certain embodiments, the authentication implementation maps the factor to one or more handlers that are called or invoked to process the context and request object for factor.

At step 355, one or more operations are performed on the context and request object based on the selected incomplete level and identified factor (e.g., the identified authentication implementation). In various embodiments, the one or more operations include the orchestrator calling or invoking the one or more handlers, for example, SMS handler, TOTP handler, push notification handler, biometric handler, username and password handler, and/or SSO or federated handler for the selected incomplete level and/or factor of authentication. At step 360, the call to the one or more handlers is intercepted by the enrollment decorator. In some embodiments, multiple levels of authentication (e.g., the second level and the third level) and any associated factors such as SMS, TOTP, biometrics, etc. are available for enrollment/registration via the inline enrollment process.

The inline enrollment process allows for enrollment or registration in multiple levels of authentication and any associated factors within a session (e.g., a session that was previously started upon completion of a first level authentication, which generated a valid session cookie). Consequently, when the orchestrator determines a user is trying to access a resource type that is identified by an authentication policy as requiring multiple levels of authentication (e.g., level two and level three), then the orchestrator may call or invoke the associated handlers and the enrollment decorator intercepts the call to ensure that the user in enrolled in the factors used for authentication at the multiple levels.

At step 362, a determination is made as to whether the user is enrolled for the factor. In some embodiments, the enrollment decorator is configured to: access the profile of the user, analyze, in the profile, the enrollment or registration status for the factor, and determine whether the user is enrolled or registered for the factor. In other embodiments, the enrollment decorator is configured to evaluate the context and request object for the information pertaining to the enrollment in the factor. When it is determined that the user has not enrolled for the factor, a response message is created at step 365 for initiating a specific authentication type enrollment (e.g., enrollment specific for the factor such as TOTP) and the call is forwarded with the response message back to the orchestrator for inline enrollment in the factor. This ensures that the user has already enrolled for the factor prior to the handlers determining the validity of the credentials. The inline enrollment process may include calling or invoking a user interface mapper. The user interface mapper maps the factor to a user interface understandable code and provides the code as an enrollment form via a user interface to the user for inline enrollment of the user in the factor, which may or may not include collection of credentials for the factor. Once the user is enrolled and optionally the credentials are collected from the user via the user interface, the context and request object is updated to include information pertaining to the enrollment in the factor and optionally the collection of the credential for the factor, and the call may be forwarded back to the orchestrator for further processing at step 325.

When it is determined that the user has enrolled for the factor, the call is forwarded at step 370 to the one or more handlers defined by the authentication implementation identified for the factor. Alternatively, the call or invoking may proceed from step 365 directly to the one or more handlers at step 370. In some embodiments, a base level or single level of authentication (e.g., the first level) and any associated factors such as username and password; SAML, or personal identifier are not available for enrollment/registration via the inline enrollment process. Consequently, when the orchestrator calls or invokes the one or more handlers (e.g., the username and password handler and/or SSO or federated handler) to process a base level or single level of authentication, the enrollment decorator does not intercept the call.

At step 370, the context and request object is evaluated to determine whether the information present in the context and request object is enough to complete authentication. When the information present in the context and request object is enough to complete authentication (e.g., the present authentication level in the session and/or any authentication credentials collected from the user satisfy the requirements for the factor) the one or more handlers will validate the credentials and complete authentication at step 375. Otherwise, a response message is created at step 372 that informs the orchestrator that a credential has not been collected for the factor and initiates a specific credential type collection (e.g., credentials specific for the factor of such as TOTP). The call is forwarded with the response message back to the orchestrator for credential collection. The credential collection may accomplished by calling or invoking a credential collector such as an embedded credential collector or a webgate that provides a switch for a detached credential collector. The credential collector provides a login form via a user interface to the user for the collection of the credential, which may or may not include enrollment or registration in the base level or single level of authentication and any associated factors. Once the credential is collected from the user via the user interface, the context and request object is updated to include the credential and optionally any enrollment information, and the call may be forwarded back to the orchestrator for further processing as described with respect to step 325.

At step 375, the credential for the factor is validated. In some embodiments, the validation includes comparing the credential provided by the user to an expected response of the factor (e.g., a user name or password saved in the user profile or a onetime password sent to the user). When the credential provided by the user matches the expected response of the factor, the credential is valid. When the credential provided by the user does not match the expected response of the factor of authentication, the credential is invalid. Once the credential is validated, a response message is created indicating: (i) that the credential has been collected for the factor, and (ii) whether the credential is valid. The call is forwarded with the response message back to the orchestrator for further processing.

At step 380, the response message is processed. In some embodiments, the processing includes determining at step 385 from the response message that the credential has been collected for the factor. At step 390, a response message is generated indicating that credential has been collected for the factor. In some embodiments, the processing includes determining at step 390 from the response message whether the credential is valid. When the credential is invalid, then at step 345 the process returns to the agent, which provides, to the client device, a failure message. In certain embodiments, the authentication policy specifies a failure URL that is included in the failure message and redirects the user based on the results of this policy evaluation to prompt the user for valid credentials and start a new session. When the credential is valid, the response message that indicates the credential has been collected for the factor is appended to also indicate that the authentication was successful. The process returns to the agent, which provides, to the client device, a success message and access to the resource. In certain embodiments, the authentication policy specifies a success URL that is included in the success message and redirects the user based on the results of this policy evaluation to access the resource.

Illustrative Systems

Figure 4:
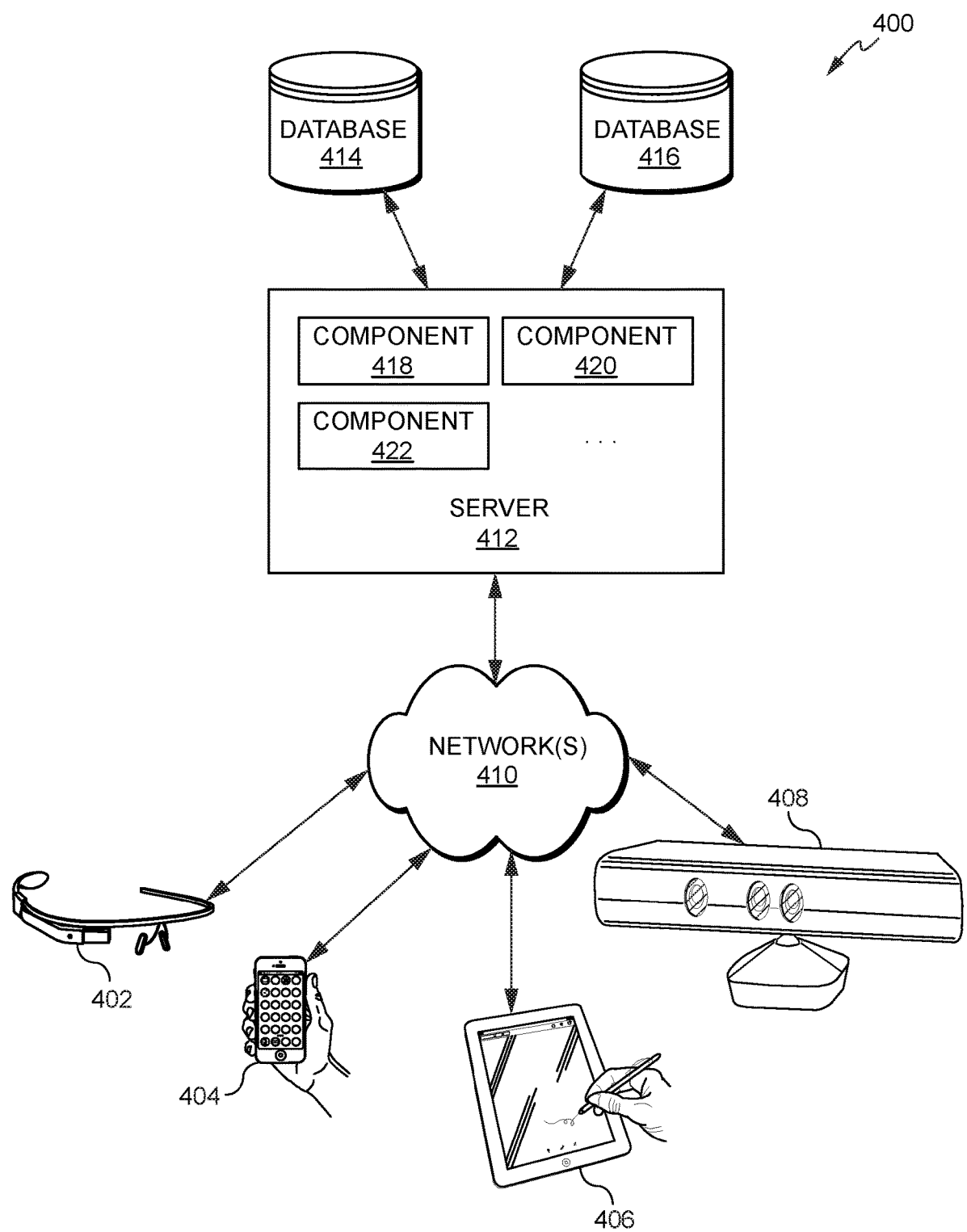
FIG. 4 illustrates a simplified diagram of a distributed system for implementing various embodiments.

FIG. 4 depicts a simplified diagram of a distributed system 400 for implementing an embodiment. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410

In various embodiments, server 412 may be adapted to run one or more services or software applications such as services and applications that may manage session activity of SSO access in a distributed environment. In certain embodiments, server 412 may also provide other services or software applications can include non-virtual and virtual environments. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Client computing devices 402, 404, 406, and/or 408 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 410.

Although distributed system 400 in FIG. 4 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various embodiments, server 412 may be adapted to run one or more services or software applications described in the foregoing disclosure. For example, server 412 may correspond to a server for performing processing as described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. These databases may provide a mechanism for storing information such as user profile information, authentication policies, authorization policies, authentication factors, and other information used in various embodiments described herein. Databases 414 and 716 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate.

In one set of embodiments, databases 414 and 416 may include relational databases, such as databases provided by Oracle that are adapted to store, update, and retrieve data in response to SQL-formatted commands.

Figure 5:
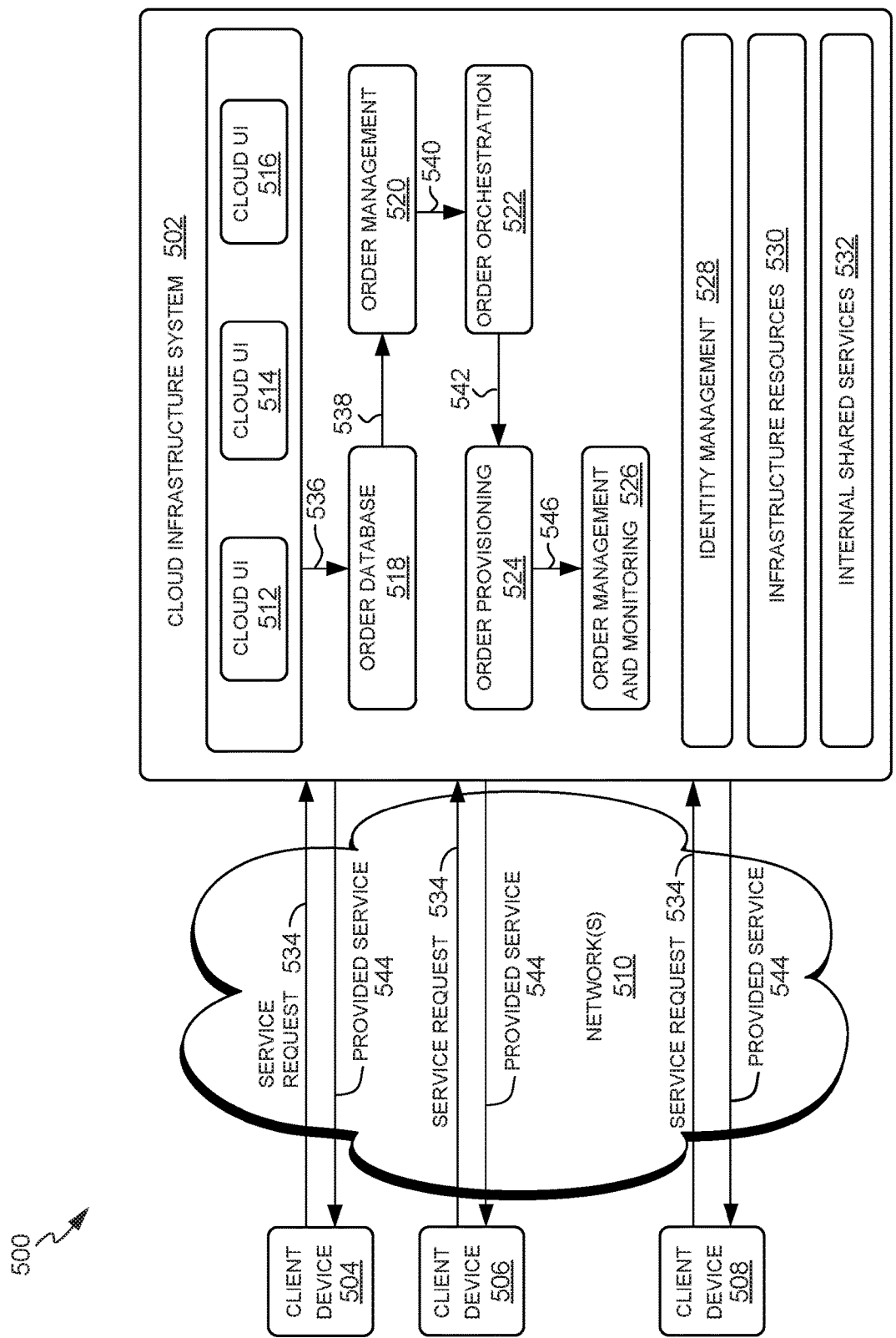
FIG. 5 illustrates a simplified block diagram of one or more elements of a system environment in which services may be offered as cloud services in accordance with various embodiments.

In some embodiments, a cloud environment may provide one or more services for managing session activity of SSO access in a distributed environment. FIG. 5 is a simplified block diagram of one or more components of a system environment 500 in which services may be offered as cloud services, in accordance with an embodiment of the present disclosure. In the illustrated embodiment in FIG. 5, system environment 500 includes one or more client computing devices 504, 506, and 508 that may be used by users to interact with a cloud infrastructure system 502 that provides cloud services, including services for managing session activity of SSO access in a distributed environment. Cloud infrastructure system 502 may comprise one or more computers and/or servers that may include those described above for server 412.

It should be appreciated that cloud infrastructure system 502 depicted in FIG. 5 may have other components than those depicted. Further, the embodiment shown in FIG. 5 is only one example of a cloud infrastructure system. In some other embodiments, cloud infrastructure system 502 may have more or fewer components than shown in the figure, may combine two or more components, or may have a different configuration or arrangement of components.

Client computing devices 504, 506, and 508 may be devices similar to those described above for client computing devices 402, 404, 406, and 408. Client computing devices 504, 506, and 508 may be configured to operate a client application such as a web browser, a proprietary client application (e.g., Oracle Forms), or some other application, which may be used by a user of the client computing device to interact with cloud infrastructure system 502 to use services provided by cloud infrastructure system 502. Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between client computing devices 504, 506, and 508 and cloud infrastructure system 502. Each network may be any type of network familiar to those skilled in the art that can support data communications using any of a variety of commercially-available protocols, including those described above for network(s) 410.

In certain embodiments, services provided by cloud infrastructure system 502 may include a host of services that are made available to users of the cloud infrastructure system on demand. In addition to services related to managing session activity of SSO access, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle Corporation) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform, and other resources.

In some embodiments, resources in cloud infrastructure system 502 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 to enable provision of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in FIG. 5, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In an exemplary operation, at step 534, a customer using a client device, such as client computing devices 804, 806 or 808, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI) such as cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 802 that the customer intends to subscribe to.

At step 536, the order information received from the customer may be stored in an order database 518. If this is a new order, a new record may be created for the order. In one embodiment, order database 518 can be one of several databases operated by cloud infrastructure system 518 and operated in conjunction with other system elements.

At step 538, the order information may be forwarded to an order management module 520 that may be configured to perform billing and accounting functions related to the order, such as verifying the order, and upon verification, booking the order.

At step 540, information regarding the order may be communicated to an order orchestration module 522 that is configured to orchestrate the provisioning of services and resources for the order placed by the customer. In some instances, order orchestration module 522 may use the services of order provisioning module 524 for the provisioning. In certain embodiments, order orchestration module 522 enables the management of business processes associated with each order and applies business logic to determine whether an order should proceed to provisioning.

As shown in the embodiment depicted in FIG. 5, at step 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At step 544, once the services and resources are provisioned, a notification may be sent to the subscribing customers indicating that the requested service is now ready for use. In some instance, information (e.g. a link) may be sent to the customer that enables the customer to start using the requested services.

At step 546, a customer's subscription order may be managed and tracked by an order management and monitoring module 526. In some instances, order management and monitoring module 526 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 500 may include an identity management module 528 that is configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
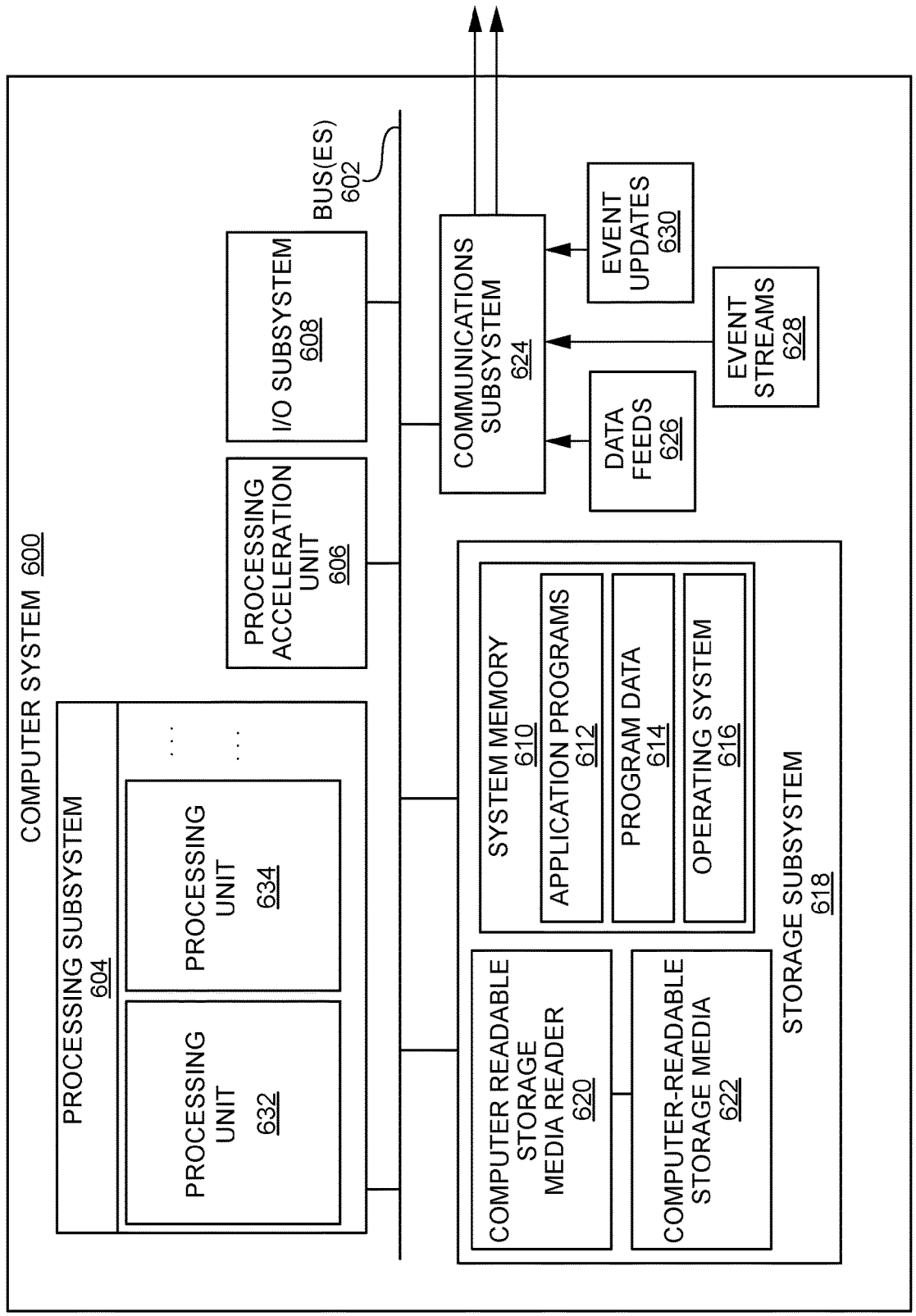
FIG. 6 illustrates an exemplary computer system that may be used to implement certain elements according to various embodiments.

FIG. 6 illustrates an exemplary computer system 600 that may be used to implement various embodiments described herein. In some embodiments, computer system 600 may be used to implement any of the various servers and computer systems described above. As shown in FIG. 6, computer system 600 includes various subsystems including a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above for managing session activity of SSO access in a distributed environment.

In certain embodiments, a processing acceleration unit 606 may be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that when executed by processing subsystem 604 a processor provide the functionality described above may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 800.

In certain embodiments, storage subsystem 600 may also include a computer-readable storage media reader 820 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client computing devices via the Internet for receiving and sending information from and to the client computing devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the invention. The modifications include any relevant combination of the disclosed features. The embodiments described herein are not restricted to operation within certain specific data processing environments, but are free to operate within a plurality of data processing environments. Additionally, although certain embodiments have been described using a particular series of transactions and steps, it should be apparent to those skilled in the art that the scope of such embodiments is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of such embodiments. The various embodiments described herein may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    receiving, at a computer system, a request for access to a resource;
    identifying, by the computer system, an authentication policy associated with the resource, wherein the authentication policy includes a multi-level and multi-factor challenge method to be used to authenticate a user for access to the resource;
    determining, by the computer system, a first level of the multi-level and multi-factor challenge method for authentication is completed, which generated an access session for the user, wherein the generating the access session comprises creating a session cookie to track and maintain the access session;
    selecting, by the computer system, a second level of the multi-level and multi-factor challenge method that has not been completed for the authentication;

identifying, by the computer system, a factor associated with completing the authentication of the second level based on the multi-level and multi-factor challenge method;

determining, by the computer system, that the user is not enrolled for the factor;

providing, by the computer system, a user interface understandable code as an enrollment form to the user via a user interface for inline enrollment of the user for the factor, wherein the user interface understandable code is provided while maintaining validity of the access session;

once the inline enrollment of the user for the factor is completed, collecting, by the computer system, a credential for the factor from the user;

determining, by the computer system, the credential collected for the factor is valid;

authenticating, by the computer system, the user for the second level based at least on the credential collected for the factor being valid, wherein the authenticating comprises updating the session cookie to include the authentication of the user for the second level; and granting, by the computer system, access to the resource within the same access session.

2. The method of claim 1, further comprising:

creating, by the computer system, a context and request object for the request, wherein the context and request object includes;

performing, by the computer system, an operation on the context and request object, wherein the operation includes calling a handler of the computer system based on the factor; and determining, by the handler of the computer system, whether the credential collected for the factor is valid.

3. The method of claim 2, further comprising:

intercepting, by an enrollment decorator of the computer system, the call to the handler prior to the call reaching the handler; and determining, by the enrollment decorator of the computer system, whether the user is enrolled for the factor.

4. The method of claim 3, further comprising:

once the user is determined not to be enrolled for the factor, invoking, by the computer system, a user interface mapper that maps the factor to the user interface understandable code; and updating, by the computer system, the context and request object to include information pertaining to the enrollment in the factor and the collection of the credential for the factor.

5. The method of claim 4, wherein the determining, by the handler of the computer system, whether the credential collected for the factor is valid includes evaluating the context and request object for the information pertaining to the collection of the credential for the factor.

6. The method of claim 5, wherein the determining, by the enrollment decorator of the computer system, whether the user is enrolled for the factor includes evaluating the context and request object for the information pertaining to the enrollment in the factor.

7. The method of claim 6, further comprising sending, by the computer system, a response message to the user that indicates the authentication was successful based at least on authenticating the user for the first level and the second level, wherein the response message includes a success URL to redirect the user to access the resource.

8. A system comprising:

an access management system that includes one or more processors and non-transitory machine readable storage medium having instructions stored thereon that when executed by the one or more processors cause the one or more processors to perform a process comprising:

receiving, at the access management system, a request for access to a resource;

identifying, by the access management system, an authentication policy associated with the resource, wherein the authentication policy includes a multi-level and multi-factor challenge method to be used to authenticate a user for access to the resource;

determining, by the access management system, a first level of the multi-level and multi-factor challenge method for authentication is completed, which generated an access session for the user, wherein the generating the access session comprises creating a session cookie to track and maintain the access session;

selecting, by the access management system, a second level of the multi-level and multi-factor challenge method that has not been completed for the authentication;

identifying, by the access management system, a factor associated with completing the authentication of the second level based on the multi-level and multi-factor challenge method;

determining, by the access management system, that the user is not enrolled for the factor;

providing, by the access management system, a user interface understandable code as an enrollment form to the user via a user interface for inline enrollment of the user for the factor, wherein the user interface understandable code is provided while maintaining validity of the access session;

once the inline enrollment of the user for the factor is completed, collecting, by the access management system, a credential for the factor from the user;

determining, by the access management system, the credential collected for the factor is valid;

authenticating, by the access management system, the user for the second level based at least on the credential collected for the factor being valid, wherein the authenticating comprises updating the session cookie to include the authentication of the user for the second level; and granting, by the computer system, access to the resource within the same access session.

9. The system of claim 8, wherein the process further comprises:

creating, by the access management system, a context and request object for the request, wherein the context and request object includes;

performing, by the access management system, an operation on the context and request object, wherein the operation includes calling a handler of the access management system based on the factor; and determining, by the handler of the access management system, whether the credential collected for the factor is valid.

10. The system of claim 9, wherein the process further comprises:

intercepting, by an enrollment decorator of the access management system, the call to the handler prior to the call reaching the handler; and determining, by the enrollment decorator of the access management system, whether the user is enrolled for the factor.

11. The system of claim 10, wherein the process further comprises:
- once the user is determined not to be enrolled for the factor, invoking, by the access management system, a user interface mapper that maps the factor to the user interface understandable code; and
- updating, by the access management system, the context and request object to include information pertaining to the enrollment in the factor and the collection of the credential for the factor.

12. The system of claim 11, wherein the determining, by the handler of the access management system, whether the credential collected for the factor is valid includes evaluating the context and request object for the information pertaining to the collection of the credential for the factor.

13. The system of claim 12, wherein the determining, by the enrollment decorator of the access management system, whether the user is enrolled for the factor includes evaluating the context and request object for the information pertaining to the enrollment in the factor.

14. The system of claim 13, wherein the process further comprises sending, by the access management system, a response message to the user that indicates the authentication was successful based at least on authenticating the user for the first level and the second level, wherein the response message includes a success URL to redirect the user to access the resource.

15. A non-transitory machine readable storage medium having instructions stored thereon that when executed by one or more processors cause the one or more processors to perform a method comprising:
- receiving a request for access to a resource;
- identifying an authentication policy associated with the resource, wherein the authentication policy includes a multi-level and multi-factor challenge method to be used to authenticate a user for access to the resource;
- determining a first level of the multi-level and multi-factor challenge method for authentication is completed, which generated an access session for the user, wherein the generating the access session comprises creating a session cookie to track and maintain the access session;
- selecting a second level of the multi-level and multi-factor challenge method that has not been completed for the authentication;
- identifying a factor associated with completing the authentication of the second level based on the multi-level and multi-factor challenge method;
- determining that the user is not enrolled for the factor;
- providing a user interface understandable code as an enrollment form to the user via a user interface for inline enrollment of the user for the factor, wherein the user interface understandable code is provided while maintaining validity of the access session;
- once the inline enrollment of the user for the factor is completed, collecting a credential for the factor from the user;
- determining the credential collected for the factor is valid;
- authenticating the user for the second level based at least on the credential collected for the factor being valid, wherein the authenticating comprises updating the session cookie to include the authentication of the user for the second level; and
- granting, by the computer system, access to the resource within the same access session.

16. The non-transitory machine readable storage medium of claim 15, wherein the method further comprises:
- creating a context and request object for the request, wherein the context and request object includes;
- performing an operation on the context and request object, wherein the operation includes calling a handler based on the factor; and
- determining, by the handler, whether the credential collected for the factor is valid.

17. The non-transitory machine readable storage medium of claim 16, wherein the method further comprises:
- intercepting, by an enrollment decorator, the call to the handler prior to the call reaching the handler; and
- determining, by the enrollment decorator, whether the user is enrolled for the factor.

18. The non-transitory machine readable storage medium of claim 17, wherein the method further comprises:
- once the user is determined not to be enrolled for the factor, invoking a user interface mapper that maps the factor to the user interface understandable code; and
- updating the context and request object to include information pertaining to the enrollment in the factor and the collection of the credential for the factor.

19. The non-transitory machine readable storage medium of claim 18, wherein the determining, by the handler, whether the credential collected for the factor is valid includes evaluating the context and request object for the information pertaining to the collection of the credential for the factor.

20. The non-transitory machine readable storage medium of claim 19, wherein the determining, by the enrollment decorator, whether the user is enrolled for the factor includes evaluating the context and request object for the information pertaining to the enrollment in the factor.

* * * * *

UNITED STATES PATENT AND TRADEMARK OFFICE
CERTIFICATE OF CORRECTION

PATENT NO. : 10,911,464 B2  
APPLICATION NO. : 16/123338  
DATED : February 2, 2021  
INVENTOR(S) : Pattar et al.

Page 1 of 1

It is certified that error appears in the above-identified patent and that said Letters Patent is hereby corrected as shown below:

In the Specification

In Column 7, Line 47, delete "aillustrative" and insert -- illustrative --, therefor.

In Column 8, Line 13, delete "the a" and insert -- a --, therefor.

In Column 8, Line 15, delete "enrollement" and insert -- enrollment --, therefor.

In Column 19, Line 43, delete "the a" and insert -- a --, therefor.

In Column 28, Line 64, delete "410" and insert -- 410. --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*